(12) United States Patent
Jaunin et al.

(10) Patent No.: US 7,904,929 B1
(45) Date of Patent: Mar. 8, 2011

(54) LOG ENTRIES

(75) Inventors: Gregoire Jaunin, Lausanne (CH); Matthew J. Burdick, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1833 days.

(21) Appl. No.: 10/699,616

(22) Filed: Oct. 30, 2003

(51) Int. Cl.
*H04N 7/173* (2006.01)
*H04N 60/32* (2006.01)
*G06F 3/00* (2006.01)
*G06F 15/16* (2006.01)
*G06F 15/173* (2006.01)
*G06F 17/60* (2006.01)
*H04L 9/00* (2006.01)

(52) U.S. Cl. .............................. 725/86; 725/14; 725/46; 709/200; 709/226; 713/201; 705/14

(58) Field of Classification Search ................... 725/86, 725/91, 97, 93; 709/219
See application file for complete search history.

(56) References Cited

U.S. PATENT DOCUMENTS

| | | | |
|---|---|---|---|
| 2002/0147645 A1* | 10/2002 | Alao et al. .................... 705/14 |
| 2004/0019808 A1* | 1/2004 | Devine et al. ................ 713/201 |
| 2004/0088412 A1* | 5/2004 | John et al. ................... 709/226 |
| 2004/0111419 A1* | 6/2004 | Cook et al. .................. 707/100 |
| 2004/0148327 A1* | 7/2004 | Satomi et al. ................ 709/200 |
| 2005/0038906 A1* | 2/2005 | Banes et al. ................. 709/238 |
| 2009/0150534 A1* | 6/2009 | Miller et al. ................. 709/223 |

* cited by examiner

*Primary Examiner* — Brian T Pendleton
*Assistant Examiner* — Jean D Saint Cyr
(74) *Attorney, Agent, or Firm* — Lee & Hayes, PLLC

(57) ABSTRACT

Log entries are described that are stored in a log during a log session. In one implementation, a content provider includes a plurality of content servers. Each content server includes a processor and memory that is configured to maintain an application and a log for storing one or more log entries. The application is executable on the processor to process a request from a client. Each of the log entries include a log session identifier (ID) that references a log session that includes the request, data that describes an action performed in the processing of the request, and a log ordering ID representing the sequence in which each said log entry was stored in the log by the content server.

16 Claims, 9 Drawing Sheets

LOG ENTRIES

TECHNICAL FIELD

The present invention generally relates to the field of content providers and more particularly relates to log entries that are stored in a log during a log session.

BACKGROUND

Users have access to an increasing variety of content providers that provide an ever increasing array of content. Television services, for instance, are widely used for delivering content. Subscribers of television services are offered a broad assortment of content, including traditional broadcast programs and movies. Newer, interactive television (ITV) systems expand the assortment of content that may be provided from a content provider. ITV systems offer the same traditional services of familiar cable television as well as a variety of new additional interactive services, such as the use of applications. Examples of applications include video-on-demand (VOD) which permits a user to order and watch streaming videos whenever desired, home shopping applications which enable a user to browse various stores and catalogs on television and order products from home, and financial applications which allow a user to conduct banking and other financial transactions using the television. Additionally, users may also access computer applications from the content provider, such as games, Internet browsers, email applications, and so on.

To provide this content to the users, a content provider may be configured to include a plurality of content servers. The number of content servers utilized by a content provider may range from a few content servers to over several hundred content servers. The content servers may be configured to provide "stateless" processing of requests that are made by users. Statelessness refers to a situation in which no signature is maintained of previous requests made by the user. Therefore, each request that is made by a user is processed based on information that is included in the request. By providing stateless processing on a content server, the processing of a request made by a user may be efficiently performed utilizing a variety of techniques. For example, the content provider may employ load balancing to distribute the processing of the requests provided by a plurality of users. Each request may be distributed by a load balancer to a different content server depending on the processing that is being performed and/or that will be performed by each of the content servers. Therefore, successive requests that are made by a single user may be routed to a different content server depending on the "load" of each content server.

During operation of the content provider, it is desirable to record actions reflecting operation of the content servers. The process of recording actions is referred to as "logging". Actions may be logged in data storage devices and later analyzed for usage and operation of the content servers. Because of the statelessness of the content servers, however, logging actions has been difficult because each request made by a user may be processed by a different content server of the content provider. If tracking of a user's requests was desired, such as is beneficial in e-commerce applications, the requests were routed to a single content server, thereby removing the statelessness of the content provider. Due to the loss of statelessness, the content provider could not utilize load balancing, virtual IP addresses, and so on. In the past, for example, successive requests that were made by a user were routed to the same content server to provide stateful processing of requests.

In an e-commerce application, for instance, a user may select items for purchase on a variety of different web pages that are provided by the content provider. To track the items selected by the user, each item that was selected by the user was formed into a request that was communicated to a single content server. Although this allowed for the tracking of request from the user, it defeated the load balancing functionality of the content provider, thereby resulting in inefficient use of the content servers of the content provider.

Therefore, there is a continuing need to provide for logging of actions such that the actions may be tracked without defeating functionality provided by stateless processing of the requests.

SUMMARY

Log entries are described that are stored in a log during a log session. Each log entry may include a log session identifier (ID) that references a log session that is initiated between a content provider and a client. The log entries describe actions that are performed to process requests from the client by one or more content servers of the content provider during the log session. Thus, the log entries preserve the statelessness of the content provider. As a result, multiple requests communicated by the client may be processed by different content servers of the content provider and described utilizing the log entries.

In one implementation, a content provider includes a plurality of content servers. Each content server includes a processor and memory that is configured to maintain an application and a log for storing one or more log entries. The application is executable on the processor to process a request from a client. Each of the log entries include a log session identifier (ID) that references a log session that includes the request, data that describes an action performed in the processing of the request, and a log ordering ID representing the sequence in which each said log entry was stored in the log by the content servers.

In an additional implementation, a method is described in which a request is received at a content provider from a client over a network. The content provider includes a plurality of content servers. The request includes a log session ID and a first log ordering ID. The request is processed by one of the content servers to find a result. The first log ordering ID is incremented to generate a second log ordering ID. A log entry is stored in a log on the content server that includes the log session ID and the first or second log ordering ID. A response is generated for communication to the client over the network. The response includes the second log ordering ID and the result of the processed request.

BRIEF DESCRIPTION OF THE DRAWINGS

The same reference numbers are utilized in instances in the discussion to reference like structures and components.

DETAILED DESCRIPTION

Overview

Figure 1:
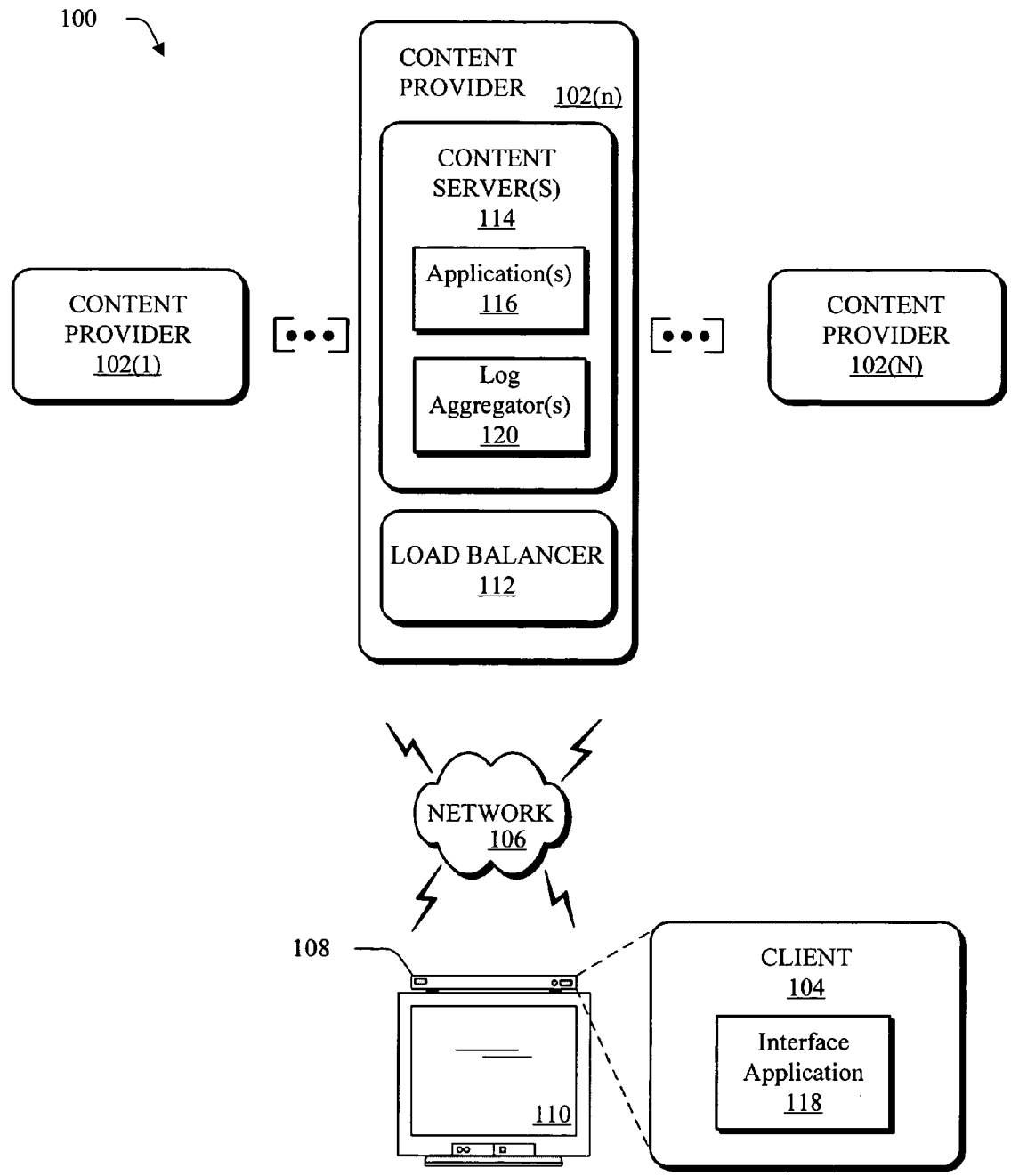
FIG. 1 is an illustration of an exemplary implementation in which a system includes a plurality of content providers that are communicatively coupled to a client over a network.

Log entries are described that are stored in a log during a log session in a content provider system. The content provider system includes one or more content providers, each of which includes one or more content servers. The content servers may be accessed over a network by a client by utilizing one or more requests. Each of the content servers includes a log having log entries that describe requests that were processed by the content servers. Each log entry includes a log session identifier (ID) that references a log session that is initiated between the content servers of the content provider and the client. The log session is utilized by the content provider to identify the client. The client, for example, may provide a client ID and a password to the content provider to initiate the log session. Once the client is identified, the content provider may process the requests that are generated by the client by executing one or more applications on one or more content servers.

The log entries describe actions that are performed to process the requests. Log entries, for example, may be created for multiple HTTP requests made by the client where each request is processed on a different content server of the content provider. The log session ID is stored with the log entries. Each log entry is generated so as to describe actions that are performed to process the corresponding request, such as by describing an aspect of the actions. The described actions may include data that had been included in the request, when the request was received, a description of an application that was executed to process the request, an amount of time taken to process the request, data that was included in a response to the request, and so on.

The log session and the log entries preserve the stateless, i.e. connectionless, nature of the protocol of the HTTP request and/or of the load balancers which may hide sets of content servers behind a virtual IP address of the content provider. For example, the log session ID may be utilized to tag each log entry so that the log entry and its corresponding log session may be identified. As a result, multiple HTTP requests communicated by the client may be processed by different content servers of the content provider and may be described utilizing the log entries.

A central monitoring application may be utilized to obtain the log entries from each content server that corresponds to the log session initiated by the client. In this way, client interaction may be tracked across each of the content servers of the content provider. The log entries may be ordered through inclusion of a log ordering ID that is incremented for each successive log entry that is stored at each content server. For example, the log ordering ID, which is unique for each request, may be incremented for each action that is performed to process each request. Thus, the log entries may describe an order at which each action was performed to process a request and may describe an order in which each request of a plurality of requests was processed.

The log entries may be utilized in a variety of ways. Reports may be generated by a central monitoring application, for instance, that describe a user's interaction with a content provider, such as which content servers and/or applications were utilized to process a request made by the user. For example, the report generated by the central monitoring application may provide a context of an exception, i.e. an error, which was encountered during the processing of the request. When the exception is reported to the central monitoring system, the central monitoring application may retrieve all or a subset of the log entries from the plurality of content servers that chronologically precede the exception. The log entries that are retrieved are those that have a log session ID that matches the log session ID of the request that resulted in the exception. Thus, the central monitoring application may request log entries not only from the content server that generated the exception but also from other content servers that processed previous requests from the client. The log entries may then be utilized to produce an exception report that describes both the generated exception and previous actions that were performed by other content servers to process previous requests made by the client during the log session. In this way, a context of the exception is provided from the log entries that describe the plurality of content servers as a whole. Traffic that is generated to transfer the log entries may be minimized by transmitting only the relevant log entries that have the matching log session ID. Additionally, memory space utilized to store the log entries may be distributed across the plurality of content servers through local storage of the log entries on the respective content server that processed the respective requests, thereby further reducing network traffic. The log entries may be discarded after a set amount of time and/or a dynamically determined amount of time.

Although the following discussion, for the sake of clarity, describes log entries for use in situations in which an exception is encountered, log entries may be utilized in a variety of ways. Log entries, for instance, may be generated to monitor system operation and derive statistical data. Statistical data is particularly beneficial for monitoring usage patterns for resource planning and marketing information. For example, a system operator in charge of providing content to subscribers might be interested in using the log entries to generate a report that describes viewer usage patterns, such as what shows the viewer watches, how often the viewer tunes in, how frequently the viewer changes channels, and so forth. Merchants offering video catalogs over an ITV system might be interested in using the log entries to generate a report that describes viewer shopping patterns, such as how often viewers used the home shopping application, how many viewers opened a particular merchant's catalog, what items in the catalog attracted the most attention, whether viewers returned to browse the same catalog multiple times, and so on.

Exemplary Systems

FIG. 1 is an illustration of an exemplary implementation showing an environment 100 that includes a plurality of content providers 102(1), . . . , 102(n), . . . , 102(N) that are communicatively coupled to a client 104 over a network 106. Content provider 102(n) may be any content provider from 2 to "N". The client 104 may be configured as a device that is capable of communication over the network 106, such as a computer, a mobile station, an entertainment appliance, a set-top box 108 and television 110 as illustrated, and so forth. The client 104 may also relate to a person and/or entity that operates the client. In other words, client 104 may describe a logical client that includes a user and/or a machine. Although one client 104 is illustrating, a plurality of clients may be utilized. Network 106 may be formed from one or more networks, such as the Internet, an intranet, a wired or wireless telephone network, a broadcast network, and so forth.

Figure 2:
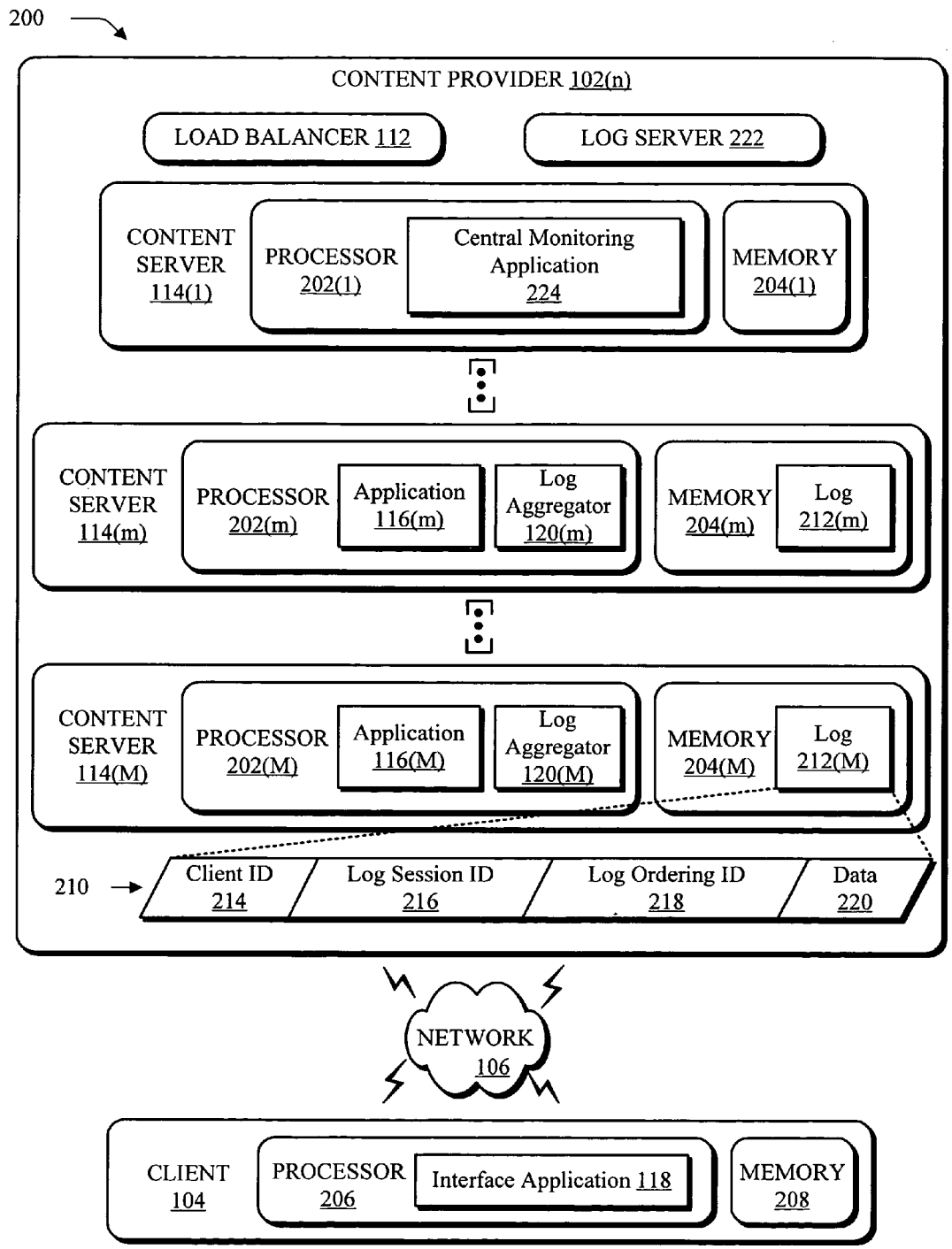
FIG. 2 is an illustration of an exemplary implementation showing one of the content providers and the client of FIG. 1 in greater detail.
Figure 9:
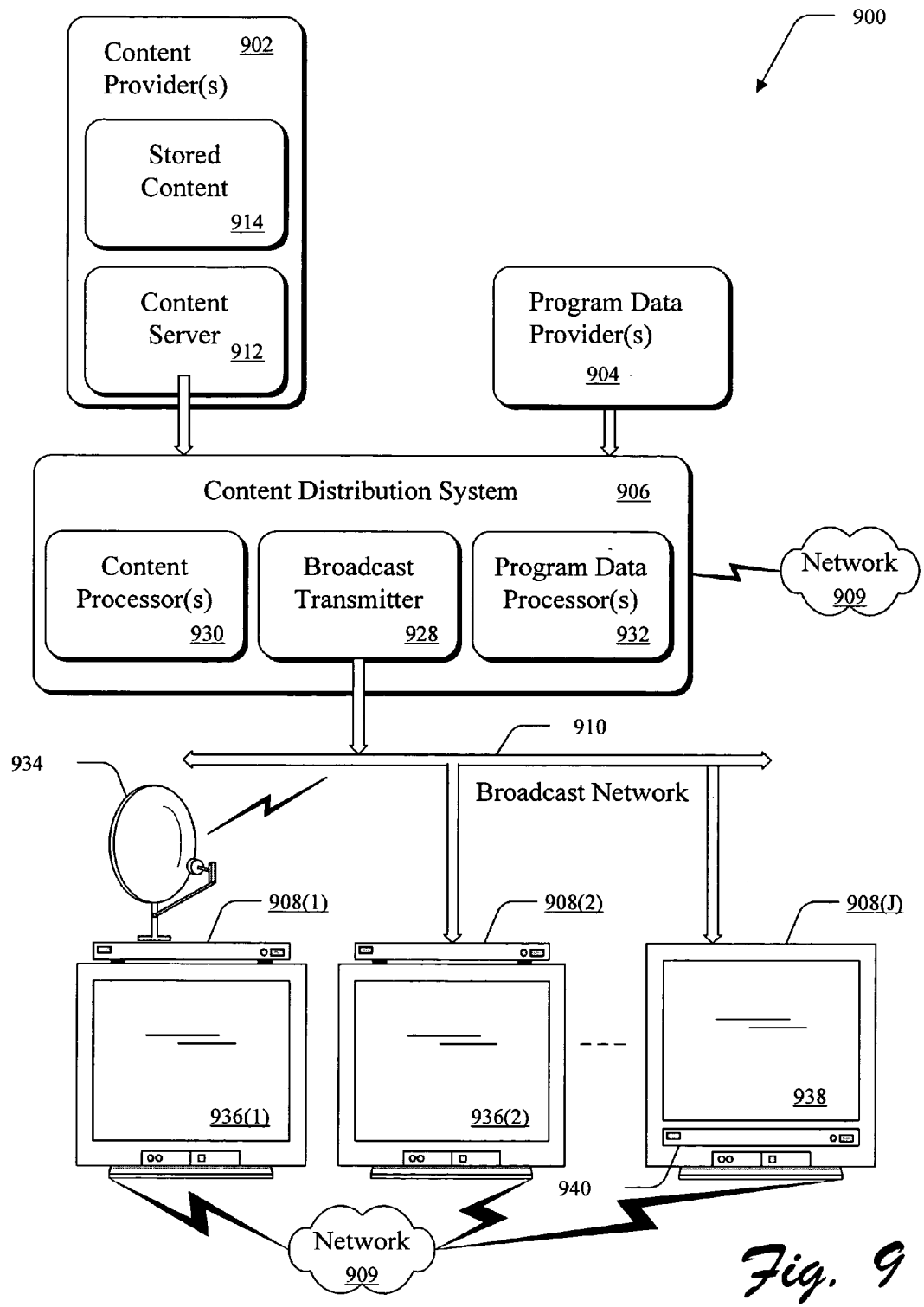
FIG. 9 illustrates an exemplary environment in which a viewer can receive multimedia content via a client device as may be implemented by the systems, apparatus, methods, and computer readable medium described herein.

The client 104 communicates with content provider 102(n), and vice versa, across the network 106 via a load balancer 112. The load balancer 112, for example, forwards one or more requests from the client 104 to a content server 114. The content server 114 includes an application 116 that when executed by the content server 114 processes the one or more requests received from the client 104 over the network 106 through the load balancer 112. The application 116, for instance, may provide content that is requested by the client 104, a further example of which is shown in FIG. 9. Additionally, although a single content server 114 is illustrated, content server 114 may include multiple content servers, a further example of which is shown in FIG. 2.

The client 104 may locate the load balancer through the network 106 by utilizing one or more virtual internet protocol (IP) addresses. Requests from the client 104 that are directed at the one or more virtual IP addresses of the load balancer 112 are received and forwarded to the respective content server 114. The load balancer 112 may include hardware and/or software components to provide load balancing.

Although the load balancer 112 is illustrated in the content provider 102(n) as a separate device, the hardware and/or software to implement the load balancer 112 may also be distributed to other aspects of the exemplary environment 100. For example, software components of the load balancer 112 may be located and executed on the content server 114.

The client 104 may utilize an interface application 118 to communicate a request across network 106 to the virtual IP address of the load balancer 112. The request may be configured in a variety of ways. For example, the content and format of the request from the client 104 may depend on the application 114 to which the request is directed. Examples of requests may include, but are not limited to:

1. Hyper text transfer protocol (HTTP) GET requests from the client 104 using the interface application 118 that is configured as a browser. Depending on the application 114, successive requests made by the client 104 may be processed by different content servers of the content provider. The requests may be transmitted over a secure sockets layer (SSL) (or other encrypted) connection.

2. Virtual private network (VPN) connections (where the content server 114 illustrated is a set of VPN servers). As such, the request may be considered to be a layer-2 tunneling protocol (L2TP) or a point-to-point tunneling protocol (PPTP) "connection" that is a combination of a transmission control protocol (TCP) control connection and associated generic routing encapsulation (GRE) data traffic.

3. Terminal server connections where the content server 114 is a set of terminal servers.

4. Proprietary requests in the form of individual TCP connections (one per request) employing a proprietary application-specific protocol.

5. Simple object access protocol (SOAP) requests.

6. Real-time communication requests involving control information over a TCP connection for latency-sensitive media streaming over real-time protocol (RTP).

Thus, requests may take many diverse, application-specific forms.

In one implementation, the load balancer 112 forwards an HTTP request from the client 104 to the content server 114. The load balancer 112 may consider a variety of load balancing factors when selecting a particular content server 114 to forward the request. For example, the load balancer 112 may take into account: load information of the content server 114, prior request routing that is employed in a round robin technique in which each successive request is routed to a different content server 114 in succession, and so forth.

The content server 114 includes a log aggregator 120 to provide session logging. The log aggregator 120 stores log entries for one or more requests that are communicated from the client 104 over the network 106. The log entries are generated such that the requests made by the client 104, including actions performed to process the requests, may be tracked across the content server 114. The session logging is performed such that the statelessness of the load balancer 112 is preserved. For example, multiple requests communicated by the client 104 may reach a different content servers 114 and still be tracked by utilizing the log entries generated by the log aggregators 120.

FIG. 2 is an illustration of an exemplary implementation showing the content provider 102(n) and client 104 of FIG. 1 in greater detail. The content provider 102(n) is communicatively coupled to the client 104 over the network 106. The content provider includes a plurality of content servers 114(1), . . . , 114(m), . . . , 114(M). Each of the content servers 114(1)-114(M) include a respective processor 202(1), . . . , 202(m), . . . , 202(M) and respective memory 204(1), . . . , 204(m), . . . , 204(M).

At least two of the plurality of content servers 114(m)-114(M) include applications 116(m)-116(M), respectively, which are illustrated as being executed on the respective processors 202(m)-202(M) and are storable in the respective memories 204(m)-204(M). The applications 116(m)-116(M), when executed, process one or more requests received from the client 104 over the network 106 to provide content, such as to provide web pages, e-commerce, remote application processing, and so on. For example, the client 104 may also include a processor 206 and memory 208. The client 104 includes an interface application 118 which is illustrated as being executed on the processor 206 and is storable in the memory 208. Through execution of the interface application 118, the client 104 may communicate one or more requests to the content provider 102(n) which are processed through execution of one of the applications 116(m)-116(M) on the respective content servers 114(m)-114(M). Each application 116(m)-116(M) may be configured to be the same as or different than the other applications 116(*m*)-116(M) that are executed on the other content servers 114(*m*)-114(M). For example, each of the applications 116(*m*)-116(M) may provide the same functionality. The load balancer 112 may forward requests received from the client 104 to different content servers 114(M)-114(M) to balance the processing performed by each of the content servers 114(*m*)-114(M). The load balancer 112 has a virtual IP address that is utilized to address the content servers 114(*m*)-114(M) as a whole. The load balancer 112 may distribute the requests from the client 104 to the content servers 114(*m*)-114(M) in a variety of ways as previously discussed.

Each of the content servers 114(*m*)-114(M) that respectively include the applications 116(*m*)-116(M) which are executed to process requests from the client 104 may also include a respective log aggregator 120(*m*)-120(M). Each of the log aggregators 120(*m*)-120(M), when executed on the respective processors 202(*m*)-202(M), generate a log entry 210 that describes an action performed to process a request. A description of an action may include the content of the request, when the request was received, a description of an application that was executed to process the request, an amount of time taken to process the request, the content of a response to the request, and so on.

The log entry 210 may include a client ID 214, a log session ID 216, a log ordering ID 218, and data 220 which describes an action. The client ID 214 identifies the client 104 that originated the request. The log session ID 216 identifies the log session that included the request. The log session ID 216 may be provided to the client 104 after the client 104 logged onto the content provider 102(*n*). "Logon" is a procedure in which the client 104 is granted access to the applications 116(*m*)-116(M) of the content provider 102(*n*) by initiating a log session. The logon procedure may include supplying a user ID, which may be the same as or different from the client ID 214, and a password. In one implementation, the user ID may be freely known and is visible when entered at a keyboard or other input device by a user on the client 104. The password may be kept secret such that it is not displayed when entered by the user on the client 104. In another implementation, the user ID and password may be entered automatically by the client 104 when initiating the log session with a log server 222 of content provider 102(*n*).

The content provider 102(*n*) may request that the client 104 register with the log server 222 in order to access the applications 116(*m*)-116(M). Through registration, the client 104 may obtain or specify the client ID 214 and a corresponding password. The registered client 104 may then access the applications 116(*m*)-116(M) by logging onto the content provider 102(*n*) to initiate a log session. During the log session, the client 104 may communicate requests that are processed through execution of the applications 116(*m*)-116(M) by the content servers 114(*m*)-114(M).

The log ordering ID 218 is utilized to describe the order of each action that was performed and/or to describe the order of each log entry that was stored in the processing of the request from the client 104 by the execution of the applications 116(*m*)-116(M). For example, the client 104 may communicate a series of requests during a log session to the content provider 102(*n*). The series of requests are processed through execution of the applications 116(*m*)-116(*m*). For each request, a log entry may be stored which includes the log ordering ID 218. The log ordering ID 218 is incremented at each successive request in the series of requests. Therefore, each log entry includes a successively incremented log ordering ID 218. In this way, log entries may be ordered even if the log entries were stored on different content servers 114(*m*)-114(M). Without the log ordering ID 218, log entries that are stored by the content servers in a stateless environment may not relate the order at which each action was performed and/or each log entry was stored by the respective content server. Therefore, although the log entries may describe actions that were performed by the content servers to process requests, the order of those actions may not be readily discernable without the log ordering ID 218 due to the stateless of the content servers of the content provider. The data 220 describes the action that was performed to process the request, such as an amount of time each of the applications 116(*m*)-116(M) was executed to process the request, the contents of the request, when the request was received, an action that was performed, a time at which a response to the request was communicated to the client 104, and so on.

Content server 114(1) includes a central monitoring application 224 which is illustrated as being executed on the processor 202(1) and is storable in memory 204(1). The central monitoring application 224, when executed, may obtain log entries from the logs 212(*m*)-212(M) of the respective content servers 114(*m*)-114(M). For example, the log entries that are obtained may have a matching log session ID. Thus, the central monitoring application 224, when executed, may request log entries from each of the content servers 114(*m*)-114(M) that processed requests from the client 104 during a log session. Additional discussion of the central monitoring application 224 may be found in relation to FIGS. 5, 6 and 8.

The central monitoring application 224 may be executed on a dedicated server that does not provide content as illustrated in FIG. 2. In another implementation, the central monitoring application 224 may be executed on a content server that also provides content. Likewise, the log server 222 may be configured to be the same as or different from the content servers 114(1)-114(M). For example, the log server 222 may be dedicated to initiation and maintenance of log sessions as shown in FIG. 2. In another example, the log server 222 may also include an application to process requests received from the client 104 in a manner similar to the content servers 114(*m*)-114(M).

Figure 3:
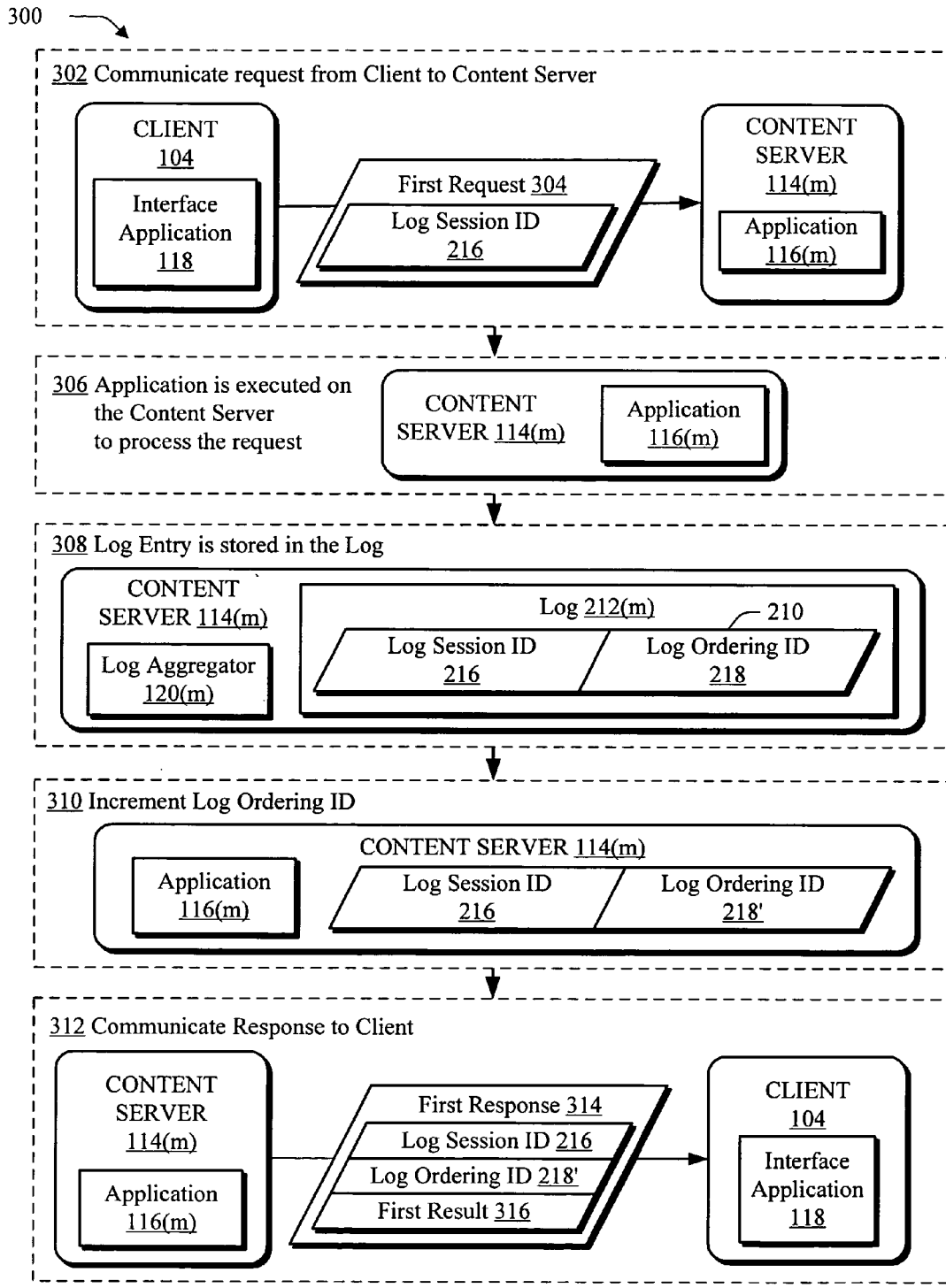
FIG. 3 is a flow chart illustrating an exemplary procedure in which a first request that is communicated from the client is processed through execution of an application on one of the content servers of FIG. 2.

FIG. 3 is an illustration of an exemplary procedure 300 in which a first request that is communicated from the client 104 is processed through execution of one of the applications 116(*m*)-116(M) on the content servers 114(*m*)-114(M) of FIG. 2, where "m" can be any number from 2 to "M". The client 104 may initiate a log session by undertaking a logon procedure with the log server 222 of FIG. 2 as previously discussed. After the log session is initiated, at block 302, the first request 304 is communicated from the client 104 to the content server 114(*m*). For example, the client 104 may execute the interface application 118 which is configured as a browser. The interface application 118 generates the first request 304 as an HTTP request for a web page. The first request 304 includes a log session ID 306 that was obtained during the logon procedure. The first request 304 is communicated to the load balancer 112 of the content provider 102(*n*) shown in FIG. 2. The load balancer 112 of FIG. 2 forwards the request to content server 114(*m*) for processing.

At block 306, the application 116(*m*) is executed on the content server 114(*m*) to process the first request 304. The application 116(*m*), when executed, may process a variety of requests to provide content. For example, the application 116(*m*) may generate a web page that was requested by the client 104, calculations may be performed by the application 116(*m*) based on data supplied in the first request 304, and so on.

At block 308, the log entry 210 is stored in the log 212(m). The log entry 210 may be stored in the log 212(m) through execution of the log aggregator 120(m). The log entry 210 includes the log session ID 216 and the log ordering ID 218. The log session ID 216 references the log session that includes the first request 304, i.e. the log session that was initiated as previously described. The log ordering ID 218 relates a sequence at which the log entry 210 was stored by the content server 114(m) with respect to other log entries that were stored or that will be stored by each of the content servers 114(m)-114(M) of the content provider 102(n).

At block 310, the log ordering ID 218 is incremented to form an incremented log ordering ID 218'. The log ordering ID 218, for instance, may include an integer that is incremented through execution of the application 116(m) and/or the log aggregator 120(m) on the content server 114(m). Although the procedure 300 illustrates execution of the application 116(m) at block 306, followed by storing the log entry 210 at block 308, and incrementing the log ordering ID 218 at block 310, blocks 306-310 and the respective steps may be arranged in a variety of ways. For example, the content server 114(m) may increment the log ordering ID 218 by executing the application 116(m) at block 310, store the log entry 210 by executing the log aggregator 120(m) at block 308, and then process the first request 304 by executing the application 116(m) at block 306. In another example, the content server 114(m) may increment the log ordering ID 218 at block 310 and process the first request 304 by executing the application 116(m) at block 306, and then store the log entry 210 having an incremented log ordering ID 218' by executing the log aggregator 120(m) at block 308.

At block 312, a first response 314 is communicated to the client 104. The first response 314 includes the log session ID 216, the incremented log ordering ID 218' and a first result 316 of the processing of the request 308 by the application 116(m) at block 306. The first result 316, for example, may be the web page that was generated by the application 116(m) that corresponds to a web page requested in the first request 304 which was communicated from the client 104 at block 302. The first result 316 may then be presented to the user of the client 104 through execution of the interface application 118, which in this instance is configured as a browser.

Figure 4:
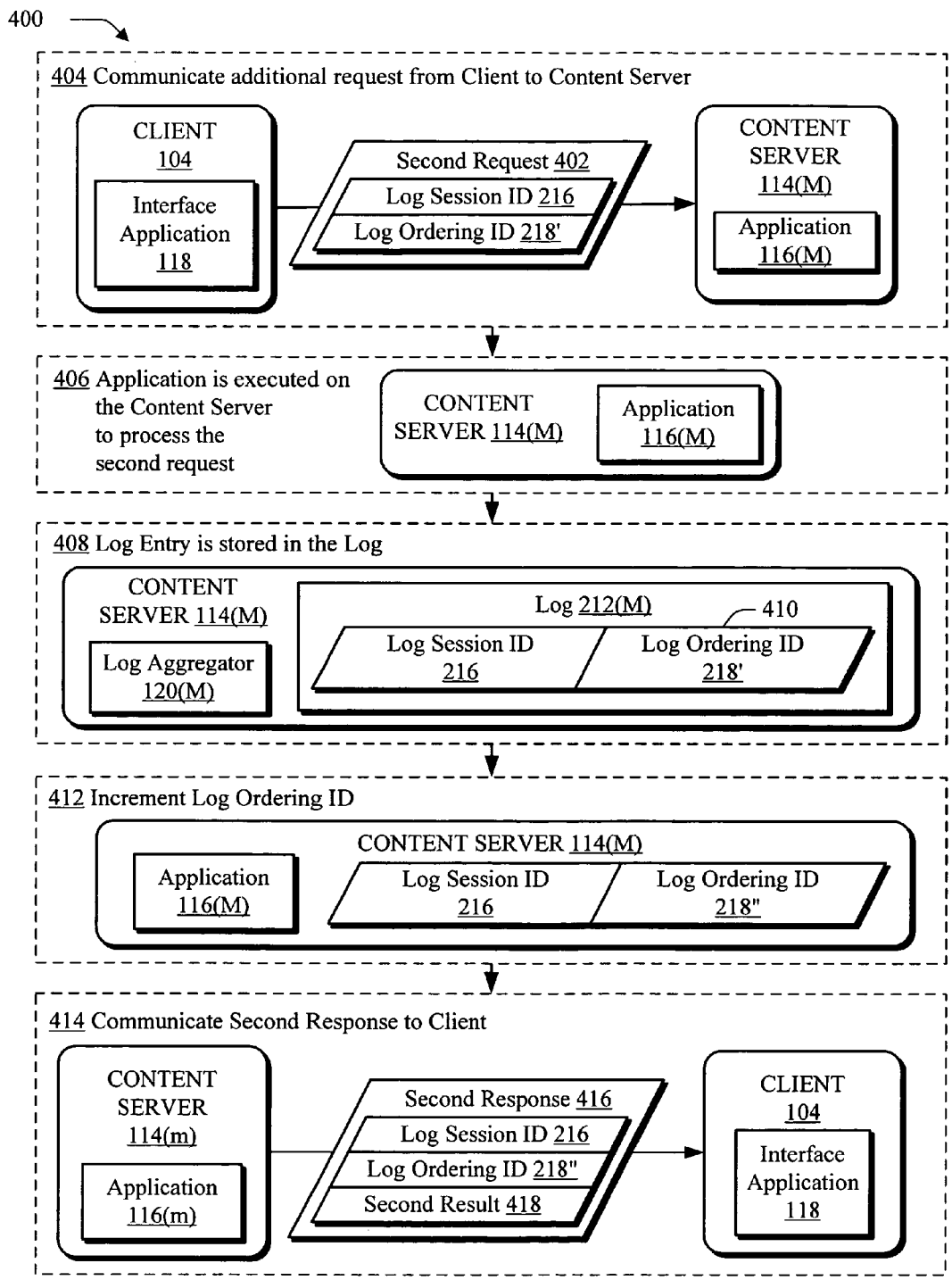
FIG. 4 is a flow chart illustrating an exemplary procedure in which the client of FIG. 3 communicates a second request to the content provider, where the second request is processed on a different content server of FIG. 2 than the content server that executed the first request in FIG. 3.

FIG. 4 is an illustration of an exemplary procedure 400 in which the client 104 of FIG. 3 communicates a second request 402 to the content provider 102(n). During the log session, the client 104 may provide the second request 402 to receive another web page from the content provider 102(n). At block 404, the second request 402 is communicated from the client 104 to the content provider 102(n) through execution of the interface application 118. The second request 402 is communicated to the load balancer 112 of the content provider 102(n) shown in FIG. 2. The second request 402 includes the log session ID 216 and the incremented log ordering ID 218' that was communicated to the client 104 at block 314 of FIG. 3. In this instance, however, the load balancer 112 of FIG. 2 forwards the second request 402 to content server 114(M) for processing, instead of to content server 114(m) as was discussed in relation to block 302 of FIG. 3.

At block 406, the application 116(M) is executed on the content server 114(m) to process the second request 402. The application 116(m), when executed, generates the web page that was requested by the client 104. At block 408, a log entry 410 is stored in the log 212(M) through execution of the log aggregator 120(M). The log entry 410 includes the log session ID 216 and the incremented log ordering ID 218'. Like the log ordering ID 218 of FIG. 4, the incremented log ordering ID 218' relates the order in which the log entry 410 was stored by the content server 114(M). In this example, the incremented log ordering ID 218' indicates that log entry 410 was stored in log 212(M) by content server 114(M) after log entry 210 was stored in log 212(m) by content server 114(m).

At block 412, the incremented log ordering ID 218' is incremented again to form a log ordering ID 218" that was incremented by both content servers 114(m), 114(M). Like the arrangement of the steps in procedure 300, the execution of the application 116(M) at block 406, the storing the log entry 410 at block 408, and the incrementing the log ordering ID 218' at block 412 may be arranged in a variety of ways. The arrangement of the steps in procedure 400, however, substantially corresponds to the arrangement of the steps in procedure 300 to preserve ordering of the log entries 210, 410 by the content servers 114(m), 114(M), respectively. For example, if in procedure 300, the log ordering ID 218 is stored and then incremented, then procedure 400 may also store and then increment the incremented log ordering ID 218' so as to preserve the ordering of the respective log entries 210, 410.

At block 414, a second response 416 is communicated to the client 104. The second response 416 includes the log session ID 216, the log ordering ID 218" that was incremented by both content server 114(m) and content server 114(M), and a second result 418 of the processing of the second request 402 by the application 116(M) at block 406. The second result 418, for example, may be the additional web page that was requested in the second request 402 at block 404.

Figure 5:
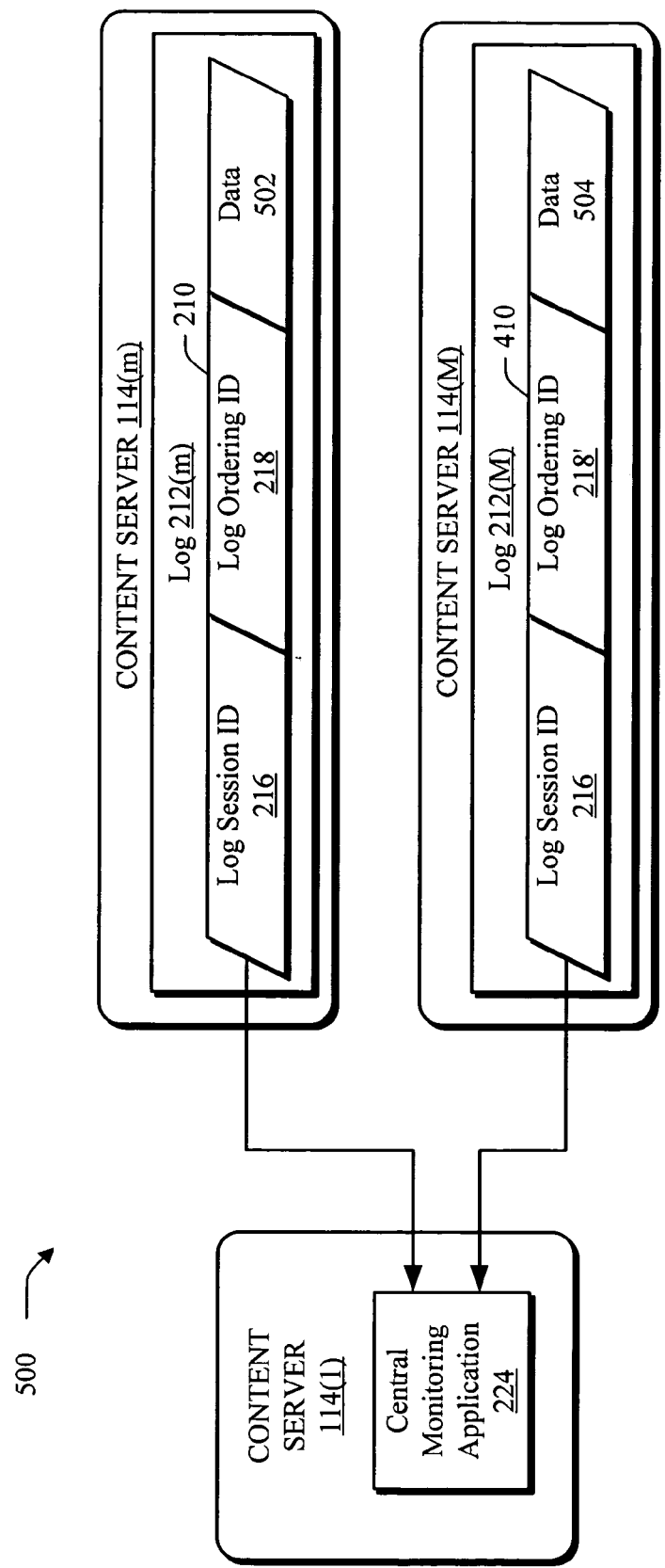
FIG. 5 is an illustration of an exemplary implementation showing execution of a central monitoring application on a content server of FIG. 2 to retrieve log entries from the content servers of FIGS. 3 and 4.

FIG. 5 is an illustration of an exemplary implementation 500 showing a control flow of execution of the central monitoring application 224 on the content server 114(1) of FIG. 2 to retrieve the log entries 210, 410 from the content servers 114(m), 114(M) of FIGS. 3 and 4. The central monitoring application 224, when executed on the processor 202(1) of content server 114(1), obtains log entries 210, 410 from the respective logs 212(m)-212(M) that are stored on the respective content servers 114(m)-114(M). The log entries 210, 410 have matching log session IDs 216. Thus, the central monitoring application 224, when executed, may obtain log entries 210, 410 from each of the content servers 114(m)-114(M) that processed requests from the client 104 during a particular log session. The particular log session is identified by the central monitoring application 224 through use of the log session ID 216 in the log entries 210, 410. In this way, the central monitoring application 224 may minimize traffic on a network that communicatively couples the content servers 114(m)-114(M) to the content sever 114(1) which executed the central monitoring application 224.

Additionally, through use of the log ordering IDs 218, 218', the log entries 210, 410 relate a sequence at which each of the log entries 210, 410 was stored by the content servers 114(m), 114(M). Therefore, a correct ordering of data 502, 504 included in the log entries 210, 410 may be achieved, yet still allow the functionality of the load balancer 112 of FIG. 2 to be utilized. As previously stated, the load balancer 112 of FIG. 2 may operate utilizing a variety of load balancing techniques, such as utilizing a round robin technique, based on load of each of the content servers 114(m)-114(M), and the like, yet still enable the log session to be accurately tracked. Thus, the log entries 210, 410 may supply a context for the interaction by the client 104 with the applications 116(m), 116(M) even though the interaction is spread across multiple content servers 114(m), 114(M).

Figure 6:
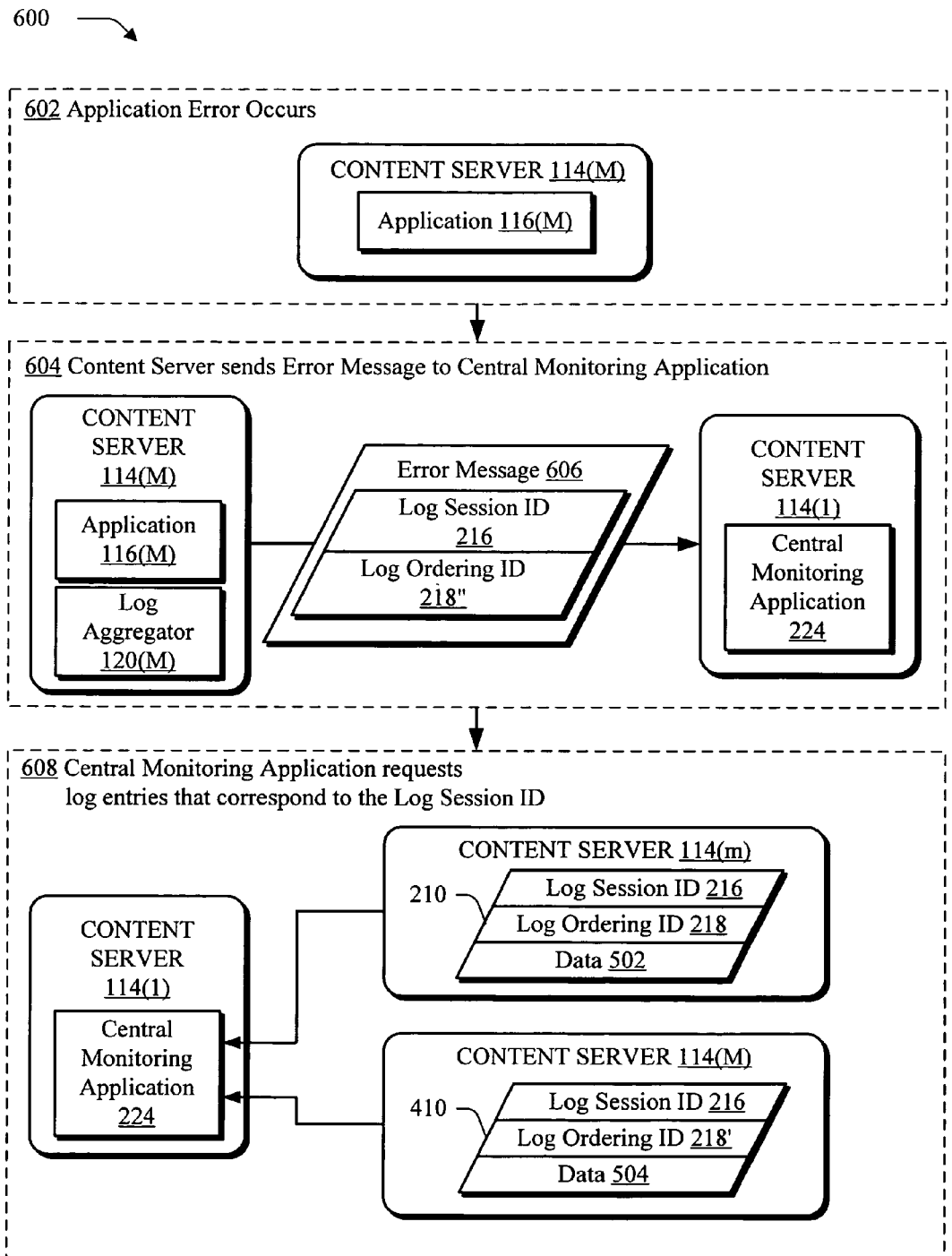
FIG. 6 is a flow chart illustrating an exemplary procedure in which the central monitoring application is executed to obtain log entries in response to an exception encountered in the execution of one or more of the applications by one of the content servers of FIG. 2.

FIG. 6 is an illustration of an exemplary procedure 600 in which the central monitoring application 224 is executed to obtain log entries 210, 410 in response to an exception encountered in the execution of one or more of the applications 116(*m*)-116(M) by one of the content servers 114(*m*)-114(M). Continuing with the previous example that was discussed in relation to FIGS. 3 and 4, the client 104 may communicate a third request after receiving the second response 416 that includes the second result 418 of the processing of the second request 402 of FIG. 4. The third request includes the log session ID 216 and the log ordering ID 218" that was incremented by both content servers 114(*m*), 114(M) as shown in FIGS. 3 and 4. At block 602, an exception is encountered during the processing of the third request by content server 114(M) through execution of the application 116(M). A variety of exceptions may be encountered, such as an error caused by software of the application 116(M) when executed on the content server 114(M), a hardware error of the content server 114(M), an error caused due to information contained in the third request that is to be processed, and so forth.

At block 604, the content server 114(M) sends an error message 606 to the central monitoring application 224 that is executed on the content server 114(1). The error message 606 includes the log session ID 216 and the log ordering ID 218" that was received from the client 104 in the third request. At block 608, the central monitoring application 224, when executed on the content server 114(1), requests log entries that match the log session ID 216. In response to the request, log entry 410 is retrieved from content server 114(M). Log entry 410 includes the log session ID 216, the log ordering ID 218', and data 504 which describes the processing of the second request 402 through the execution of the application 116(M) by the content server 114(M) at block 406 of FIG. 4. Likewise, log entry 210 is retrieved from content server 114(*m*). Log entry 210 includes the log session ID 216, the log ordering ID 218, and data 502 which describes the processing of the first request 304 through the execution of the application 116(*m*) by content server 114(*m*) at block 306 of FIG. 3. Thus, through execution of the central monitoring application 224, the log entry 410 may be retrieved that describes previous processing that was performed by the content server 114(M) that generated the exception. Additionally, the log entry 210 may be retrieved that describes previous processing that was performed by another content server, e.g. content server 114(*m*), before the exception was generated by the content server 114(M). Further, the log entries 210, 410 may be ordered based on the log ordering IDs 218, 218' such that the sequence at which each action was performed (e.g., the execution of the applications 116(*m*), 116(M)) may be observed. In this way, the content server 114(1), through execution of the central monitoring application 224, may obtain a context of processing in which the exception occurred that includes previous processing that was performed before the exception was encountered. Thus, the previous processing may provide a context for examination of the exception such that, through debugging, a determination may be made as to whether the previous processing caused the exception.

Figure 7:
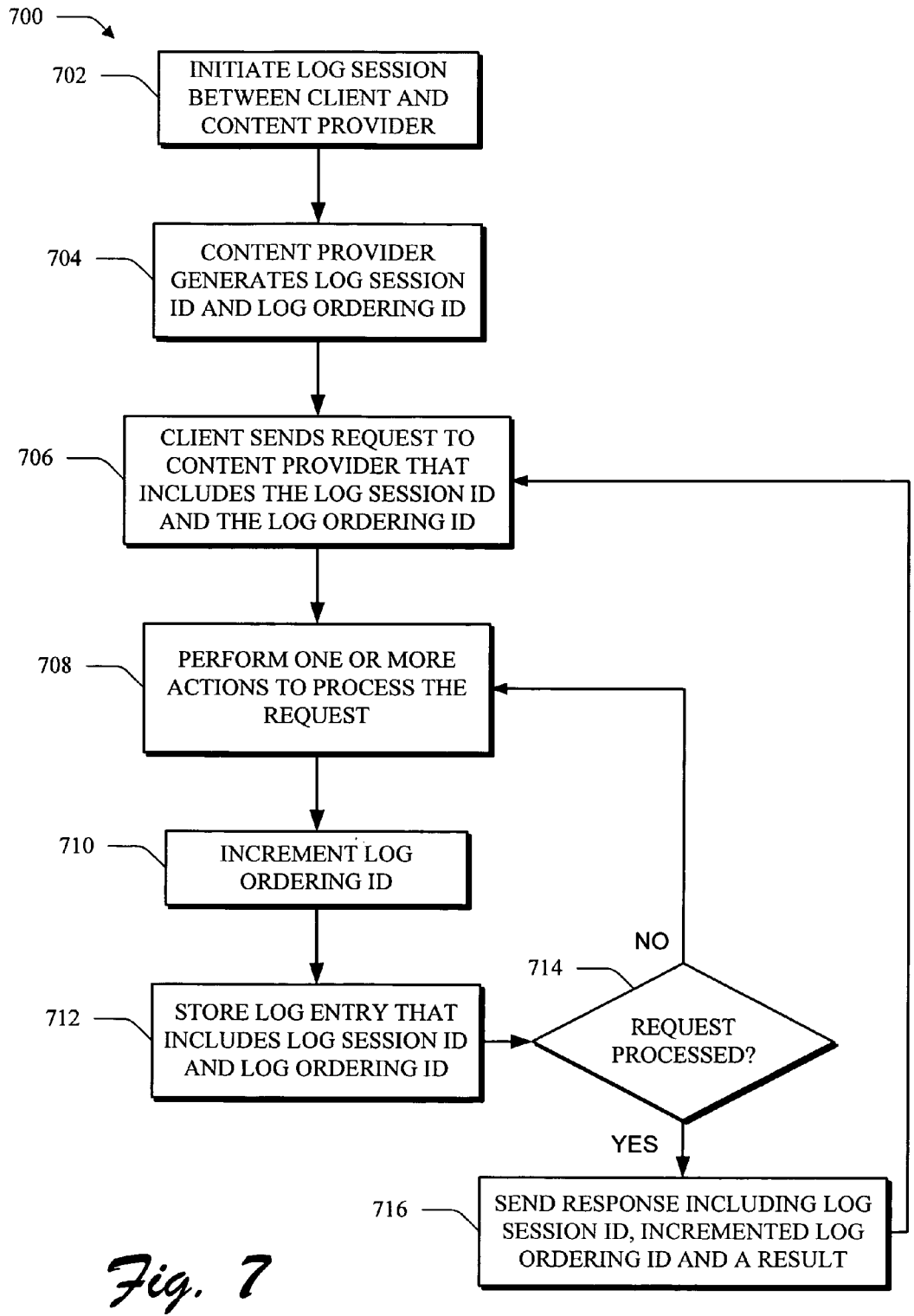
FIG. 7 is a flow chart illustrating a procedure in an exemplary implementation in which log entries are stored that describe actions that are performed to process a request received from a client.

FIG. 7 is a flow chart depicting a procedure 700 in an exemplary implementation in which log entries are stored which describe actions that are performed to process a request received from a client. At block 702, a log session is initiated between the client and the content provider. For example, as shown in FIG. 2, the client 104 may provide a client ID and password to the log server 222 over the network. The log server 222 of FIG. 2 may verify the user ID and password and, if valid, initiate the log session. At block 704 the content provider generates a log session ID and a log ordering ID for the log session. The log session ID and the log ordering ID, for example, may be generated by log server 222 of FIG. 2 during the initiation of the log session. The log session ID and the log ordering ID are then communicated to the client.

At block 706, the client sends a request to the content provider that includes the log session ID and the log ordering ID. The client 104 of FIG. 2, for instance, may send an HTTP request to the content provider 102(*n*) for a desired web page. The request is received by the load balancer 112 of the content provider 102(*n*) of FIG. 2 and is forwarded to one of the content servers 114(*m*)-114(M) that executes a respective one of the applications 116(*m*)-116(M) to process the request.

At block 708, one or more actions are performed to process the request. The actions that are performed to process the request are not limited to the execution of an application, but may also include a variety of other actions that are performed to provide the request to the application and to communicate the result of the execution of the application. For example, as shown in FIG. 2, the request may be received by the content server 114(*m*), the application 116(*m*) may be executed on the processor 202(*m*), and/or a result may be obtained from the execution of the application 116(*m*).

At block 710, the log ordering ID is incremented. The log ordering ID, for instance, may be incremented by adding "one" to an integer that is included in the log ordering ID. At block 712, a log entry is stored that includes the log session ID and the incremented log ordering ID. In this way, the log entry may be identified with a corresponding log session during which the log entry was generated. An order may also be identified for the log entry with respect to other log entries that are stored and/or will be stored during the log session through use of the log ordering ID. At decision block 714, if the processing of request is not completed, the procedure 700 may return to block 708 to perform additional actions to process the request. If the request is processed at decision block 714, a response is communicated at block 716 that includes the log session ID, the incremented log ordering ID, and a result of the processing. Blocks 706-716 may then be repeated for each additional request that is communicated from the client. For example, the client during a second iteration of block 706 may provide a second request that includes the log session ID and the incremented log ordering ID. Thus, ordering of the actions taken to process each request and the ordering of the requests may be indicated by the log ordering ID. In this way, a log session having log entries that include the log session ID and the log ordering ID may provide a context for actions taken in response to requests provided by a particular client during the log session even if the actions are performed by different content servers of the content provider.

Figure 8:
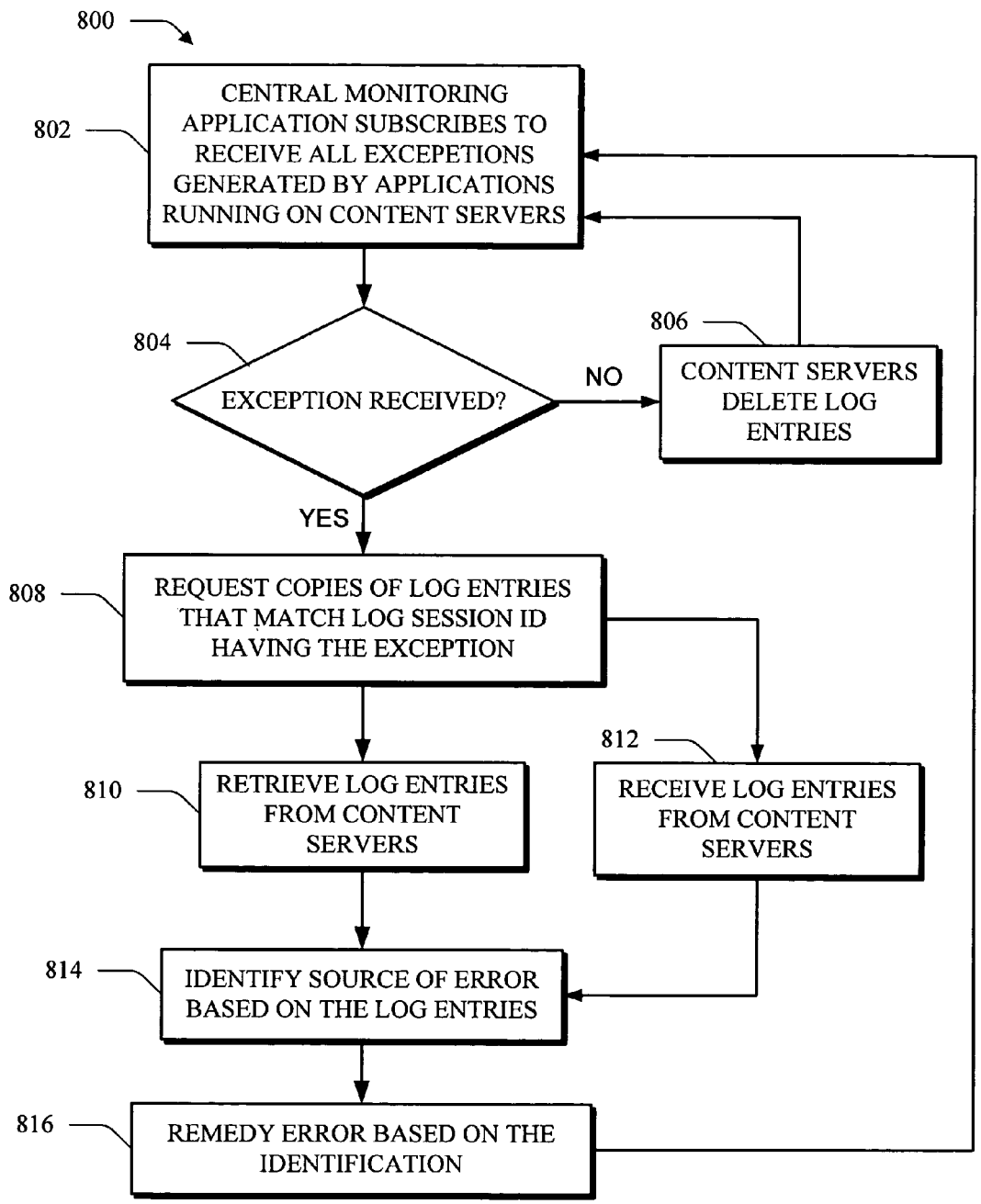
FIG. 8 is a flow chart depicting a procedure in an exemplary implementation in which log entries are obtained by a central monitoring application from a plurality of content servers in a situation in which an exception is received.

FIG. 8 is a flow chart depicting a procedure 800 in an exemplary implementation in which log entries are obtained by the central monitoring application from the plurality of content servers when an exception is received. At block 802, the central monitoring application subscribes to receive all exceptions generated by applications that are executed on content servers. In another implementation, the central monitoring application monitors the content servers. For example, the central monitoring application 224 of FIG. 2 may poll each of the applications 116(*m*)-116(M) that are executed on the processors 202(*m*)-202(M) of the content servers 114(*m*)-114(M).

At decision block 804, a determination is made as to whether an exception is received. If an exception is not received, each of the content servers may delete log entries at block 806 after a specified period of time. In another implementation, each of the content servers may store the log entries in a circular buffer. For example, each log 212(*m*)-212(M) of FIG. 2 may be stored in a dedicated portion of the respective memory 202(*m*)-204(M), each having a fixed size.

When the dedicated portion is filled, the oldest log entry that is stored in the logs 212(*m*)-212(M) is overwritten by the most recent log entry.

If an exception is received at block 804, then copies of the log entries are requested at block 808 that have a log session ID corresponding to the log session ID in a request that resulted in the exception. For example, the request may be communicated from the client to the particular content server that has the log session ID. If an exception is encountered during the processing of the request by the content server, the log entries that have a matching log session ID are obtained from each of the content servers by the central monitoring application. The log entries may be obtained in a variety of ways. At block 810, for example, the log entries are retrieved, e.g. read from memory, by the central monitoring application, when executed, from the content servers. At block 812, the log entries are received by the central monitoring application from the content servers in response to a query.

At block 814, a source of the exception is identified based on the log entries that were obtained at blocks 810-812. At block 816 the error is remedied based on the identification 816. As previously stated, the log entries may be obtained through execution of the central monitoring application from the particular content server that encountered the exception as well as from the other content servers that processed previous requests from the client. The central monitoring application, when executed, may order the log entries based on the log ordering IDs such that a context is provided for the successive actions that were performed to process the requests and for the successive requests that were processed. In this way, a source of the exception may be identified even though the source occurred on a different content server than the one that encountered the exception.

Exemplary Environment

FIG. 9 illustrates an exemplary environment 900 in which a viewer may receive content via a client as may be implemented by the systems, apparatus, methods, and computer readable medium described herein. Exemplary environment 900 is a television entertainment system that facilitates distribution of content to multiple viewers. The environment 900 includes one or more content providers 902, one or more program data providers 904, a content distribution system 906, and multiple clients 908(1), 908(2), . . . , 908(J) coupled to the content distribution system 906 via a broadcast network 910. By way of analogy, environment 900 corresponds to environment 100, content providers 902 may correspond to content providers 102(1)-102(N), and clients 908(1)-908(J) may correspond to client 104. Each client 908 (1 through J) and the content distribution system 906 are in communication with a network 909 that provides two-way communications there between. Although the broadcast network 910 and the network 909 are shown separately, in additional implementations each client 908 (1 through J) may obtain content over network 909, including content that was traditionally broadcast over the broadcast network 910, such as television programming. The content distribution system 906 services requests from the clients 908(1)-908(J), such as the first and second requests 304, 402 described respectively in relation to FIGS. 3 and 4.

Content provider 902 includes a content server 912 and stored content 914, such as movies, television programs, commercials, music, and similar audio and/or video content. Content server 912 controls distribution of the stored content 914 from content provider 902 to the content distribution system 906. For example, the content server 912 may broadcast the stored content 914 to one or more of the clients 908(1)-908(J) in response to a request received from the clients 908(1)-908(J). Additionally, content server 902 controls distribution of live content (e.g., content that was not previously stored, such as live feeds) and/or content stored at other locations to the content distribution system 906.

Program data provider 904 stores and provides an electronic program guide (EPG) database. EPG data in the EPG includes program titles, ratings, characters, descriptions, actor names, station identifiers, channel identifiers, schedule information, and so on.

The program data provider 904 processes the EPG data prior to distribution to generate a published version of the program data which contains programming information for all channels for one or more days. The program data provider 904 controls distribution of the published version of the program data to the content distribution system 906 using, for example, a file transfer protocol (FTP) over a TCP/IP network (e.g., Internet, UNIX, etc.). Further, the published version of the program data can be transmitted from program data provider 904 via a satellite 934 directly to a client 908 by use of a satellite dish 934.

Content distribution system 906 includes a broadcast transmitter 928, one or more content processors 930, and one or more program data processors 932. Broadcast transmitter 928 broadcasts signals, such as cable television signals, across broadcast network 910. Broadcast network 910 can include a cable television network, RF, microwave, satellite, and/or data network, such as the Internet, and may also include wired or wireless media using any broadcast format or broadcast protocol. Additionally, broadcast network 910 can be any type of network, using any type of network topology and any network communication protocol, and can be represented or otherwise implemented as a combination of two or more networks. Although broadcast transmitter 928 is illustrated as within the content distribution system 906, the broadcast transmitter may also be included with the content server 912.

Content processor 930 processes the content received from content provider 902 prior to transmitting the content across broadcast network 908. Similarly, program data processor 932 processes the EPG data received from program data provider 904 prior to transmitting the program data across broadcast network 910. A particular content processor 930 may encode, or otherwise process, the received content into a format that is understood by the multiple clients 908(1), 908(2), . . . , 908(J) coupled to broadcast network 910. Although FIG. 9 shows a single content provider 902, a single program data provider 904, and a single content distribution system 906, exemplary environment 900 can include any number of content providers and/or program data providers coupled to any number of content distribution systems.

Content distribution system 906 is representative of a headend service with one or more carousels that provides content to multiple subscribers. For example, the content may include a result of processing that was performed in response to a request sent by one or more of the clients 908(1)-908(J). In one implementation, for example, content distribution system 906 utilizes a carousel file system to repeatedly broadcast the result over an out-of-band (OOB) channel to the clients 908.

Clients 908 can be implemented in a number of ways. For example, a client 908(1) receives broadcast content from a satellite-based transmitter via satellite dish 934. Client 908(1) is also referred to as a set-top box or a satellite receiving device. Client 908(1) is coupled to a television 936(1) for presenting the content received by the client (e.g., audio data and video data), as well as a graphical user interface. A particular client 908 can be coupled to any number of televisions 936 and/or similar devices that can be implemented to display or otherwise render content. Similarly, any number of clients 908 can be coupled to a single television 936.

Client 908(2) is also coupled to receive broadcast content from broadcast network 910 and provide the received content to associated television 936(2). Client 908(J) is an example of a combination television 938 and integrated set-top box 940. In this example, the various components and functionality of the set-top box are incorporated into the television, rather than using two separate devices. The set-top box incorporated into the television may receive broadcast signals via a satellite dish (similar to satellite dish 934) and/or via broadcast network 910. In alternate implementations, clients 908 may receive broadcast signals via network 909, such as the Internet, or any other broadcast medium.

Each client 908 runs an application, such as the interface application 118 shown in FIG. 1. The application may enable a television viewer to navigate through an onscreen program guide, locate television shows of interest to the viewer, and purchase items, view linear programming as well as pay per view and/or video on demand programming. As such, one or more of the program data providers 904 can include stored on-demand content, such as Video On-Demand (VOD) movie content, and near VOD such as pay per view movie content. The stored on-demand and near on-demand content can be viewed with a client 908 through an onscreen movie guide, for example, and a viewer can enter instructions to stream a particular movie, or other stored content, down to a corresponding client 908.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
   receiving a first request by a load balancer at a content provider from a client over a network, wherein:
      the first request includes a log session identifier (ID) and a first log ordering ID; and
      the content provider includes a plurality of content servers;
   processing the first request on a first content server of the plurality of content servers to find a first result;
   incrementing the first log ordering ID to generate a second log ordering ID designated for use by the client in a second request to the content provider;
   storing a log entry in a log on the first content server that includes:
      the log session ID; and
      the first log ordering ID or the second log ordering ID;
   generating a first response at the content provider for communicating to the client over the network, wherein the first response includes:
      the second log ordering ID designated for use by the client in a second request to the content provider; and
      the first result of the processed first request;
   receiving a second request by the load balancer at the content provider from the client, wherein the second request includes the log session ID and the second log ordering ID provided to the client in the first response;
   processing the second request on a second content server of the plurality of content servers to find a second result;
   incrementing the second log ordering ID to generate a third log ordering ID designated for use by the client in a third request to the content provider;
   storing a log entry in a log on the second content server that includes:
      the log session ID; and
      the second log ordering ID or the third log ordering ID; and
   generating a second response for communicating over the network to the client, wherein the second response includes:
      the third log ordering ID designated for use by the client in a third request to the content provider;
      the second result of the processed second request;
   reporting an exception encountered during processing of the third request, the third request including the log session ID and the third log ordering ID;
   requesting log entries from a content server that generated the exception and that match the log session ID and requesting log entries from a subset of other content servers that processed requests that chronologically precede the exception and that match the log session ID;
   utilizing the log entries to generate an exception report that provides a context of the exception, the context including identifying a source of the exception and describing how to remedy the exception; and
   utilizing the log entries to generate a second report different from the exception report describing viewer usage patterns and viewer shopping patterns, the viewer usage patterns including information relating to which programs a viewer watches, a frequency in which the viewer tunes in to watch programs, and a frequency in which the viewer changes channels, and the viewer shopping patterns including information relating to a frequency in which the viewer uses a home shopping application, a number of viewers who opened a catalog of a particular merchant, which items in the catalog attracted the most attention, and whether the viewers browsed the catalog multiple times.

2. A method as described in claim 1, further comprising:
   initiating the log session; and
   generating the log session ID.

3. A method as described in claim 1, wherein the log entry further comprises data that describes the processing of the request.

4. A method as described in claim 1, wherein the request is selected from the group consisting of:
   an order for a good or service that is available for purchase; and
   an order for content that is available for broadcast by the content provider.

5. A content provider comprising a plurality of content servers, wherein a first content server of the plurality of content servers includes a processor and memory configured to maintain:
   an application that is executable on the processor to:
      process a first request from a client, the first request including a log session identifier (ID) and a first log ordering ID; and
      increment the first log ordering ID to a second log ordering ID designated for use by the client in a second request to the content provider; and
   a log for storing a log entry associated with the first request, wherein the log entry has:
      the log session identifier (ID) that references a log session that includes the request;

data that describes an action performed in the processing of the first request, wherein the data is selected from the group consisting of:
data that had been included in the first request;
a time at which the first request was received by the application;
a description of the application;
an amount of time taken to process the first request; and
data that was included in a response to the first request; and
the first log ordering ID or the second log ordering ID representing the sequence in which each log entry was stored in the log by the content server and unique for each action that was performed in the processing of the first request, wherein the second log ordering ID is designated for use by the client in a second request to the content provider;
wherein the first content server is further configured to generate a response for communication to the client in response to receiving the first request, the response including a result of the processing of the first request and the second log ordering ID designated for use by the client in a second request to the content provider; and
a central monitoring application that is executable on the processor to:
report an exception encountered during processing of the second request, the second request including the log session ID and the second log ordering ID;
request log entries from a content server that generated the exception and that match the log session ID and request log entries from a subset of other content servers that processed requests that chronologically precede the exception and that match the log session ID;
utilize the log entries to generate an exception report that provides a context of the exception, the context including identifying a source of the exception and describing how to remedy the exception; and
utilize the log entries to generate a second report different from the exception report describing viewer usage patterns, the viewer usage patterns including information relating to viewer-watched television programs and the viewer shopping patterns including information relating usage of a home shopping application and viewer-accessed catalogues.

6. A content provider as described in claim 5, further comprising a load balancer that:
is communicatively coupled to the plurality of content servers; and
provides load balancing for the plurality of content servers for the processing of the first request from the client.

7. A content provider as described in claim 5, further comprising a log server to:
initiate the log session that includes the first request from the client; and
generate the log session ID that references the log session.

8. A content provider as described in claim 5, wherein the log entry further comprises a client ID that identifies the client.

9. A content provider as described in claim 5, wherein the log entry is stored in the memory of the first content server that processed the first request.

10. A content provider as described in claim 5, wherein the first request is selected from the group consisting of:

an order for a good or service that is available for purchase; and
an order for content that is available for broadcast by execution of the application.

11. A content provider, comprising:
a log server to initiate a log session with a client and generate a log session ID that references the log session;
a load balancer that provides load balancing of one or more requests received during the log session from the client over a network;
a first content server that is communicatively coupled to the load balancer, wherein the first content server includes a processor and memory configured to maintain one or more applications that are executable on the processor to:
process a first request from the client received from the load balancer by performing one or more actions to find a first result;
increment a first log ordering identifier (ID) to generate a second log ordering ID designated for use by the client in a second request to the content provider;
store a log entry on the first content server, the first log entry having:
the log session ID that references the log session;
data that describes one action, wherein the data is selected from the group consisting of:
data that had been included in the first request;
a time at which the first request was received by the application;
a description of the application;
an amount of time taken to process the first request; and
data that was included in a response to the first request; and
the first log ordering ID or the second log ordering ID that is unique for the one action;
generate a first response for communication to the client over the network, wherein the first response includes:
the second log ordering ID designated for use by the client in a second request to the content provider; and
the first result of the processed first request;
a second content server that is communicatively coupled to the load balancer, wherein the second content server includes a processor and memory configured to maintain one or more applications that are executable on the processor to:
process a second request from the client received from the load balancer by performing one or more actions to find a second result, wherein the second request includes the log session ID and the second log ordering ID provided to the client in the first response;
increment the second log ordering ID to generate a third log ordering ID designated for use by the client in a third request to the content provider;
store a log entry in a log on the second content server that includes:
a client ID that identifies the client that provided the second request;
the log session ID; and
the second log ordering ID or the third log ordering ID;
generate a second response for communication over the network to the client, wherein the second response includes:
the third log ordering ID designated for use by the client in a third request to the content provider; and the second result of the processed second request; and
a central monitoring application configured to:
- receive a report regarding an exception encountered during processing of the third request, the third request including the log session ID and the third log ordering ID; and
- receive a second report different from the exception report describing viewer usage patterns and viewer shopping patterns, the viewer usage patterns including information relating to which programs a viewer watches, a frequency in which the viewer tunes in to watch programs; and the frequency in which the viewer changes channels, and the viewer shopping patterns including information relating to a frequency in which the viewer uses a home shopping application, a number of viewers who opened a catalog of a particular merchant, which items in the catalog attracted the most attention, and whether the viewers browsed the catalog multiple times.

12. A system, comprising:
a set-top box communicatively coupled to a network, and including a processor and memory that is configured to maintain an interface application that is stored in the memory and is executable on the processor to communicate one or more requests comprising an order for a good or service that is available for purchase or an order for content that is available for broadcast by a content provider over a network; and
the content provider that is communicatively coupled to the set-top box over the network, and including:
- a log server to initiate a log session with the set-top box and to generate a log session ID that references the log session;
- a load balancer that provides load balancing of the one or more requests received during the log session from the set-top box over the network; and
- a plurality of content servers that are communicatively coupled to the load balancer, wherein a first content server of the plurality of content servers includes a processor and memory that is configured to maintain one or more applications that are executable on the processor to:
  - process a first request to find a first result;
  - increment a first log ordering identifier (ID) received from the set-top box with the first request to generate a second log ordering ID designated for use by the set-top box in a second request to the content provider;
  - store a log entry on a log in the memory of the first content server that processed the first request, wherein the log entry has:
    - a set-top box ID that identifies the set-top box that communicated the first request;
    - the log session identifier (ID) that references the log session;
    - data that describes an action performed in the processing of the first request; and
    - the first log ordering ID or the second log ordering ID designated for use by the set-top box in a second request to the content provider, wherein the log ordering IDs represent the sequence in which log entries are stored by the plurality of content servers; and
  - generate a response for communication to the set-top box over the network, wherein the response includes the first result of the processing of the first request and the second log ordering ID designated for use by the set-top box in a second request to the content provider; and
- a central monitoring application configured to:
  - receive a report regarding an exception encountered during processing of the second request, the second request including the log session ID and the second log ordering ID; and
  - receive a second report different from the exception report describing viewer shopping patterns, the viewer shopping patterns including information relating to a frequency in which the viewer uses a home shopping application, a number of viewers who opened a catalog of a particular merchant, which items in the catalog attracted the most attention, and whether the viewers browsed the catalog multiple times.

13. A content provider as described in claim 11, wherein the central monitoring application is further configured to:
request log entries from a content server that generated the exception and that match the log session ID and request log entries from other content servers that processed requests that chronologically precede the exception and that match the log session ID.

14. A content provider as described in claim 13, wherein the central monitoring application is further configured to:
utilize the log entries to generate an exception report that provides a context of the exception, the context including identifying a source of the exception and describing how to remedy the exception.

15. A system of claim 12, wherein the central monitoring application is further configured to:
request log entries from a content server that generated the exception and that match the log session ID and request log entries from other content servers that processed requests that chronologically precede the exception and that match the log session ID.

16. A system of claim 15, wherein the central monitoring application is further configured to:
utilize the log entries to generate an exception report that provides a context of the exception, the context including identifying a source of the exception and describing how to remedy the exception.

* * * * *